United States Patent
Nordstrom

(10) Patent No.: US 9,436,745 B2
(45) Date of Patent: Sep. 6, 2016

(54) PROVIDING TASK-BASED INFORMATION

(71) Applicant: Google Inc., Mountain View, CA (US)

(72) Inventor: Paul G. Nordstrom, Seattle, WA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 15/070,249

(22) Filed: Mar. 15, 2016

(65) Prior Publication Data

US 2016/0196316 A1   Jul. 7, 2016

Related U.S. Application Data

(63) Continuation of application No. 14/927,807, filed on Oct. 30, 2015, now Pat. No. 9,311,174, which is a continuation of application No. 13/838,005, filed on Mar. 15, 2013, now Pat. No. 9,183,238.

(51) Int. Cl.
*G06F 17/30* (2006.01)
*G06Q 30/00* (2012.01)
*G06F 11/07* (2006.01)

(52) U.S. Cl.
CPC ..... *G06F 17/30554* (2013.01); *G06F 11/0721* (2013.01); *G06F 11/0769* (2013.01)

(58) Field of Classification Search
CPC .............. G06Q 30/0271; G06Q 30/0217; G06Q 30/0222; G06Q 30/0253; G06Q 30/0255; G06Q 30/0278; G06F 17/3005; G06F 17/30289; G06F 17/30292; G06F 17/30861
See application file for complete search history.

(56) References Cited

U.S. PATENT DOCUMENTS

| | | | |
|---|---|---|---|
| 6,915,336 B1 * | 7/2005 | Hankejh | G06Q 30/0645 709/205 |
| 7,600,202 B1 * | 10/2009 | Burnham | G06F 17/504 716/136 |
| 8,005,823 B1 | 8/2011 | Marshall et al. | |
| 8,020,099 B1 | 9/2011 | Lu | |
| 8,170,915 B2 * | 5/2012 | Borders | G06Q 10/0631 705/26.9 |
| 8,489,924 B2 | 7/2013 | Nakatsugawa | |
| 8,756,326 B1 | 6/2014 | Elberse et al. | |
| 8,786,662 B2 | 7/2014 | Bicanic et al. | |

(Continued)

OTHER PUBLICATIONS

Kuniyoshi et al. Learning by Watching: Extracting Reusable Task Knowledge from Visual Observation of Human Performance, IEEE Transactions on Robotics and Automation, vol. 10, No. 6, Dec. 1994, 24 pages.

(Continued)

*Primary Examiner* — Cheryl Lewis
(74) *Attorney, Agent, or Firm* — Fish & Richardson P.C.

(57) ABSTRACT

Methods, systems, and apparatus, including computer programs encoded on a computer storage medium, for providing task-based information are disclosed. In one aspect, a method includes identifying a set of previous interactive sessions for a particular task. For each identified interactive session in the set of previous interactive sessions, a set of implements used during the interactive session are identified based on content of the interactive session. At least one implement in the identified set of implements is classified as a required implement for the particular task. The classification is based, at least in part, on a portion of the previous interactive sessions in which the implement was identified. Classified implements are indexed according to the particular task. Data identifying the indexed implements are provided in response to receipt of a search query referencing the particular task.

20 Claims, 7 Drawing Sheets

(56) References Cited

U.S. PATENT DOCUMENTS

| | | | |
|---|---|---|---|
| 9,183,238 B2* | 11/2015 | Nordstrom | G06F 17/30321 |
| 9,311,174 B2* | 4/2016 | Nordstrom | G06F 17/30321 |
| 2002/0004747 A1 | 1/2002 | Nishioka | |
| 2002/0007225 A1 | 1/2002 | Costello et al. | |
| 2002/0078403 A1 | 6/2002 | Gullo | |
| 2005/0102119 A1 | 5/2005 | Alvarez et al. | |
| 2005/0102571 A1* | 5/2005 | Peng | G06Q 10/06 714/26 |
| 2005/0132298 A1 | 6/2005 | Lueckhoff et al. | |
| 2006/0230011 A1 | 10/2006 | Tuttle et al. | |
| 2010/0017265 A1 | 1/2010 | Weingarten et al. | |
| 2010/0235406 A1 | 9/2010 | Williams et al. | |
| 2011/0082735 A1 | 4/2011 | Kannan et al. | |
| 2011/0314084 A1 | 12/2011 | Saretto et al. | |
| 2012/0304222 A1 | 11/2012 | Morris et al. | |
| 2013/0085886 A1 | 4/2013 | Satish et al. | |
| 2014/0067302 A1* | 3/2014 | Bickford | H01L 22/20 702/81 |

OTHER PUBLICATIONS

Ettinger, G.J. "Large Hierarchial Object Recognition Using Libaries of Parameterized Model Sub-parts" Computer Vision and Pattern Recognition, 1988. Proceedings CVPR '88., Computer Society Conference on Jun. 1998, 32 pages.

International Search Report and Written Opinion in International Application No. PCT/US14/23983, mailed Aug. 1, 2014, 8 pages.

\* cited by examiner

PROVIDING TASK-BASED INFORMATION

CROSS-REFERENCE TO RELATED APPLICATIONS

This application is a continuation application of, and claims priority to, U.S. patent application Ser. No. 14/927,807, titled "Providing Task-Based Information," filed on Oct. 30, 2015 now U.S. Pat. No. 9,311,174, which application is a continuation application of, and claims priority to, U.S. patent application Ser. No. 13/838,005, titled "Providing Task-Based Information," filed on Mar. 15, 2013 now U.S. Pat. No. 9,183,238. The disclosure of the foregoing applications are incorporated herein by reference in their entirety for all purposes.

BACKGROUND

This specification relates to data processing and content distribution.

The Internet facilitates exchange of information between users across the globe. This exchange of information enables service providers to provide services to users that are not located in the same geographic regions as the service provider. Similarly, users that are interested in obtaining services over the Internet can identify service providers without limiting their search to local service providers.

SUMMARY

Users can participate in interactive sessions in which various tasks are performed. For example, a user interested in repairing a computer can participate in an interactive session that demonstrates how to repair a computer. Prior to participating in an interactive session, a user may be interested in knowing what implements (e.g., tools, parts, or supplies) are required to perform one or more tasks performed in the interactive session, which are referred to as required implements. The user may also be interested in knowing what implements are optional for performing the one or more tasks, which are referred to as optional implements.

In some implementations, data specifying the set of required implements and/or the set of optional implements for performing a particular task can be provided to a user device that submitted a search query referencing the particular task. The set of required implements can be identified as such based on implements used in interactive sessions in which the particular task is performed. For example, a set of interactive sessions in which the particular task is performed can be analyzed (e.g., using video and/or audio analysis) to identify implements that appear, or are audibly referenced, in the interactive session. If a particular implement is identified in at least a threshold portion of the interactive sessions, the particular implement can be classified as a required implement. The identified implements that are not identified as required implements can be classified as optional implements. The required and/or optional implements for a particular task can be indexed according to the particular task, and provided in response to a search query referencing the particular task.

In some implementations, content items (e.g., advertisements) that are provided with the search results can be selected based on the set of required and/or optional implements for the particular task. For example, if a hammer is listed as a required implement for the particular task, an advertisement for a hammer can be provided with the search results. The selection of the content item can also be performed, at least in part, on information related to implements that the user owns, or is otherwise associated with, information related to one or more of the user's implements that are nearing an end of their useful period, and other information, such as information identifying previous interactive sessions that the user has experienced.

In some implementations, reliability measures for products and/or parts can be determined based on the interactive sessions in which products are serviced. For example, a failure rate for each part in a product can be determined based on a portion of the interactive sessions in which the part is serviced. The failure rates for the various parts of a product can be used to create a reliability profile for the parts of the product. This reliability profile can provide information related to the likelihood that failure of the product is caused by a particular part of the product. The reliability profile can be provided, for example, to manufacturers of the product and/or users. When a search query is received referencing failure of the product, the reliability profile can be used to suggest an interactive session for servicing one or more parts of the product.

In general, one innovative aspect of the subject matter described in this specification can be embodied in methods that include the actions of identifying, by one or more data processing apparatus, a set of previous interactive sessions for a particular task, each interactive session for the particular task being an online session during which the particular task was performed; identifying, for each interactive session in the set of previous interactive sessions and based on content of the interactive session, a set of implements used during the interactive session; classifying, by one or more data processing apparatus, at least one implement in the identified set of implements as a required implement for the particular task, the classification of the implement being performed based, at least in part, on a portion of the previous interactive sessions in which the implement was identified; indexing classified implements according to the particular task; receiving a search query that references the particular task; and providing, by one or more data processing apparatus, data identifying the indexed implements in response to receipt of the search query. Other embodiments of this aspect include corresponding systems, apparatus, and computer programs, configured to perform the actions of the methods, encoded on computer storage devices.

These and other embodiments can each optionally include one or more of the following features. Methods can include the actions of identifying a set of previously used implements for a user based on previous interactive sessions that were requested by the user device; determining that the indexed implements include a required implement that is not included in the set of previously used implements; and providing an advertisement for the required implement to the user device.

Methods can include the actions of identifying a set of previously used implements for a user based on previous interactive sessions that were requested by the user device; identifying, from the set of previously used implements, a particular previously used implement that matches a required implement for the particular task; determining, based on characteristics of the particular previously used implement, that replacement of the particular previously used implement is recommended; and providing, in response to determining that replacement of the particular previously used implement is recommended, an advertisement for the particular previously used implement to the user device.

Identifying the set of implements can include the actions of receiving data identifying an object presented during the interactive session, the identification being based on one or more of visual object recognition or speech recognition; and including the object in the set of implements.

Methods can include the actions of determining, for a particular product, a reliability profile indicative of failure rates for each of the one or more parts of the particular product, the failure rate for each part being based, at least in part, on a number of interactive sessions in which the part is serviced.

Methods can include the action of providing the reliability profile to a manufacturer of the product.

Receiving a search query can include receiving, from the user device, a search a search query referencing failure of the particular product.

Methods can include the actions of identifying, based on the failure profile, a candidate failed part of the particular product; and providing, in response to receipt of the search query, data identifying an interactive session in which the candidate failed part is serviced, wherein: providing data identifying the indexed implements can include providing data identifying indexed implements for servicing the failed part.

Identifying a set of implements used during the interactive session can include identifying a set of parts used during the interactive session; classifying each of one or more parts in the identified set of parts as a required part for the particular task or a sometimes used part for the particular task, the classification of the part being performed based, at least in part, on a portion of the previous interactive sessions in which the part was used; identifying a set of tools used during the interactive session; and classifying each of one or more tools in the identified set of tools as either a required tool for the particular task or a sometimes used tool for the particular task, the classification of the tool being performed, at least in part, based on a portion of the previous interactive sessions in which the tool was used.

Particular embodiments of the subject matter described in this specification can be implemented so as to realize one or more of the following advantages. Users are provided information that enables them to ensure that they have all required implements for performing a task prior to beginning to perform the task. A source of implements that are not possessed by the user can be provided to the user to facilitate acquisition of the implements prior to engaging in the task. Product manufacturers can identify and address product reliability issues based on the reliability profiles generated based on the interactive sessions.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
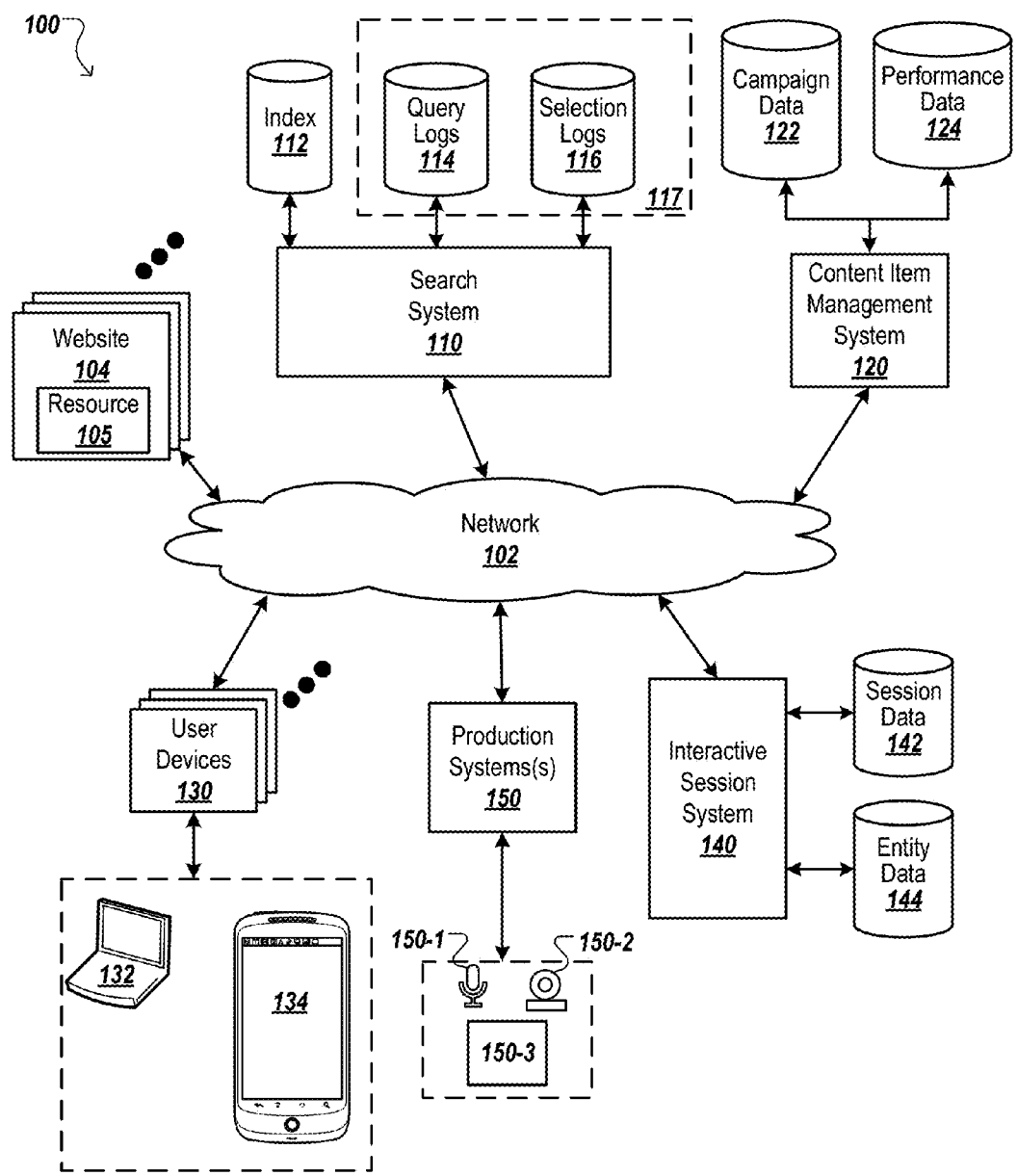
FIG. 1 is a block diagram of an example environment in which content related to task performance is distributed.

FIG. 1 is a block diagram of an example environment 100 in which content related to task performance is distributed. A data communication network 102 enables data communication between multiple electronic devices. Users can access content, provide content, exchange information, and participate in interactive sessions by use of the devices and systems that can communicate with each other over the network 102. The network 102 can include, for example, a local area network (LAN), a cellular phone network, a wide area network (WAN), e.g., the Internet, or a combination of them. The links on the network can be wireline or wireless links or both.

A website 104 includes one or more resources 105 associated with a domain and hosted by one or more servers in one or more locations. Generally, a website is a collection of web pages (or other resources) formatted in hypertext markup language (HTML) that can contain text, images, multimedia content, and programming elements, for example, scripts. Each website 104 is maintained by a content publisher, which is an entity that controls, manages and/or owns the website 104.

A resource 105 is data provided over the network 102 and that has a resource address, e.g., a uniform resource locator (URL). Resources may be HTML pages, electronic documents, image files, video files, audio files, and feed sources, to name just a few. The resources may include embedded information, e.g., meta information and hyperlinks, and/or embedded instructions, e.g., client-side scripts.

In operation, a search system 110 crawls the web sites 104 and indexes the resources 105 provided by the web sites 104 in an index 112. The search system 110 can receive queries from user devices 130. In response to each query, the search system 110 searches the index 112 to identify resources and information that are relevant to the query. The search system 110 identifies the resources in the form of search results and returns the search results to the user device 130. A search result is data, generated by the search system 110, that identifies a resource or provides information that satisfies a particular search query. A search result for a resource can include a web page title, a snippet of text extracted from the web page, and a resource locator for the resource, e.g., the URL of a web page.

The search results are ranked based on scores related to the resources identified by the search results, e.g., information retrieval ("IR") scores, and optionally a separate ranking of each resource relative to other resources, e.g., an authority score. The search results are ordered according to these scores and provided to the user device according to the order.

A user device 130 receives the search results and presents them to a user. If a user selects a search result, the user device 130 requests the resource that is referenced by the search result. For example, if a search result includes an active link to the web pages example.com, user interaction with this search result will cause the user device to request the resource located at example.com. The publisher of the web site 104 hosting the resource receives the request for the resource and provides the resource to the user device 130.

In some implementations, the queries submitted from user devices 130 are stored in query logs 114. Selection data for the queries and the web pages referenced by the search results and selected by users are stored in selection logs 116. The selection logs 116 represent actions taken responsive to search results provided by the search engine 110.

The query logs 114 and the selection logs 116 are examples of search history data 117. The search history data 117 include data from, and related to, previous search requests associated with unique identifiers. The search history data 117 can be used to map queries submitted by user devices to resources that were identified in search results and the actions taken by users when presented with the search results in response to the queries. In some implementations, data are associated with (e.g., indexed according to) the identifiers from the search requests so that a search history for each identifier can be accessed. The search history data 117 can thus be used by the search system to determine the respective sequences of queries submitted by user devices, the actions taken in response to the queries, and how often the queries have been submitted.

In situations in which the systems described here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

The content item management system 120 provides content items for presentation with the resources 105. A content item is a unit of content (e.g., content stored in one or more files) that is provided for presentation with a resource in response to a request for a content item. In some implementations, a request for a content item is initiated based on execution of a code snippet that is included in a resource. For example, when a user device receives the data representing a resource, the data may include a portion of code that, upon execution by the user device, causes the user device to request a content item from the content item management system 120. Thus, a content item may be requested in response to a request for a resource, and the content item may be hosted by a different server and/or entity than the resource with which the content item will be presented.

A variety of content items can be provided for presentation with a resource. One example content item is an advertisement. In the case of advertisements, the content item management system 120 allows advertisers to specify selection rules that take into account attributes included in the content item request to provide relevant advertisements for the users. Example selection rules include selection keywords with which an advertiser can associate bids. The bids specify an amount that the advertiser will pay for their advertisement to be presented in response to content item requests that include data specifying search queries, resource content, or metadata that match the selection keywords. Advertisements that are associated with keywords having bids that result in an advertisement slot being awarded based on the outcome of an auction are selected for presentation in advertisement slots that are included in the resource.

In the case of advertisements, the content item management system 120 includes a data storage system that stores campaign data 122 and performance data 124. The campaign data 122 stores advertisements, selection information, and budgeting information for advertisers. The performance data 124 stores data indicating the performance of the advertisements that are served. Such performance data can include, for example, click-through rates for advertisements, the number of impressions for advertisements, and the number of conversions for advertisements. Other performance data can also be stored.

The campaign data 122 and the performance data 124 are used as input to an advertisement auction. In some implementations, the content item management system 120, in response to each request for advertisements, conducts an auction to select advertisements that are provided in response to the request. The advertisements are ranked according to a score that, in some implementations, is proportional to a value based on an advertisement bid and one or more parameters specified in the performance data 124. The highest ranked advertisements resulting from the auction are selected and provided to the requesting user device.

A user device 130 is an electronic device, or collection of devices capable of requesting and receiving resources over the network 102. Example user devices 106 include personal computers 132, mobile communication devices 134, and other devices that can send and receive data over the network 102. A user device 130 typically includes a user application, e.g., a web browser, that sends and receives data over the network 102, generally in response to user actions. The web browser can enable a user to display and interact with text, images, videos, music and other information typically located on a web page at a web site on the world wide web or a local area network.

An interactive session system 140 is also accessible by the user devices 130 over the network 102. The interactive session system 140 serves interactive sessions (also referred to as "sessions") and data related to interactive sessions to users of user devices 130. The term "interactive session" is used in this specification to refer to a presentation that allows a user to experience an event or receive data related to the event. Events of different types can be presented. In some implementations, events may be "assistance" events, for which interactive sessions provide step-by-step assistance to users to accomplish a particular task, or events may be "experience" events, for which interactive sessions provide users with an experience of participating in an activity. An example interactive session for an assistance event is a session that describes a step-by-step process to build a computer. An example interactive session for an experience event is a session that provides the experience of driving a certain make and model of an automobile. The interactive session system 140 may also provide interactive sessions for other appropriate event types.

Furthermore, the data that the interactive session system 140 provides for an event may also differ based on the event type and based on the intent of the user. For example, interactive sessions for repair events may provide users with a list of tools and parts required to accomplish a task at the beginning of an interactive session. Likewise, a user may have implicitly or explicitly specified an intent for viewing an interactive session. The user may explicitly specify an intent, for example, by interacting with a user interface element that represents their intent. A user may implicitly specify an intent, for example, by submitting a search query that is related to the intent, or by requesting other information that is related to the intent. For example, a user request for information about purchasing tools needed to repair a computer may be considered an implicit indication of the user's intent to repair a computer.

The interactive session system 140 may determine specific data to provide to a user based on the intent of the user. For example, a user that is viewing a session that describes building a computer, and with the intent to build the computer, may be presented with additional information, e.g., a list of parts, tools and the time required to complete the task. Another user that is watching the same session with the intent to learn about computers may be presented with other information, e.g., articles about memory, heat dissipation, or other computer-related topics, in a side panel of a viewing environment as the interactive session is presented.

The sessions can be created by expert assistants or non-expert users. The term "expert assistant" is used in this specification to refer to a user or entity that has been accepted by the system 140 for a category, e.g., as a result of the user's or entity's having provided credentials, professional registrations, or demonstrated a high level of skill with respect to a particular task category. Examples of expert assistants include a licensed contractor for construction related sessions, a company that produces sessions for a particular product the company manufactures, and a user that has produced a large number of highly rated sessions for a particular task category.

In some implementations, the content item management system 120 can provide content items with the interactive sessions. In the case of advertisements, the content item management system 120 may select advertisements based on the subject matter of a session (e.g., the task category to which the session has been classified), the event type, and the user's intent. For example, for a repair event, the content item management system 120 may provide advertisements for providers of tools and parts that are identified in the list of tools and parts required to accomplish the repair task.

Production systems 150 can be used to create interactive sessions. Production systems 150 may range from studios to simple hand-held video and/or audio recording systems. Generally, a production system 150 is a system that includes one or more of an audio input device 150-1, a video input device 150-2, an optional display device 150-3, and optionally other input devices, output devices, and production processes that are used to create sessions. For example, post production processes may be used to add metadata to an interactive session. Such metadata may include, for example, keywords and topical information that can be used to classify the session to one or more topical categories; a list of tools and part required for a particular session and descriptions of the tools and parts; and so on.

Tactical sensory input devices may also be used in a production system 150. For example, a particular interactive session may provide input data for a "G-suit" that applies pressure to a user's body and that the user interprets as simulated motion. Accordingly, appropriate input systems are used in the production system 150 to generate and store the input data for the interactive session.

Production systems 150 may also be or include devices that are attached to a person. For example, for "point of view" sessions, wearable computer devices that include a camera input device and microphone input device may be worn on a user's person during the time the user is creating the session.

A session is stored as session data 142 and is associated with an authoring entity, or provider, by entity data 144. For example, session data 142 for a particular session can be stored with an identifier identifying the session and entity data 144 identifying the entity that is credited with authoring the session. Additionally, the session data 142 for each session can include data, such as labels, that specify tasks that are performed during the session. For example, a session related to cooking a pork shoulder may include labels such as "selecting a pork shoulder," "preparing the grill," and other labels that describe the tasks demonstrated or performed in the session. The labels can be provided by and entity that created or provided the interactive session. The labels can also, or alternatively, be provided by users that have previously viewed the session. The labels can be associated with one or more timestamps indicating a start time at which the task begins in the session and a stop time at which the task ends in the session, such that a duration of the task can be determined.

A user device 130 can access the interactive session system 140 to request an interactive session. The interactive session system 140 can provide a user interface to the user devices 130 in which interactive sessions are arranged according to a topical hierarchy. In some implementations, the interactive session system 140 includes a search subsystem that allows users to search for interactive sessions. Alternatively, the search system 110 can search the session data 142 and the entity data 144.

For example, in response to receiving a query from a user device 130, the search system 110 can identify one or more sessions that are deemed relevant to the query (e.g., based on a relevance score). Alternatively, or additionally, the search system 110 can interact with the interactive session system 140 to obtain data identifying one or more sessions that are deemed relevant to the query. In response to the query, the search system 110 can provide a search result referencing the one or more sessions that were deemed relevant to the query. When a user interacts with a search result that references a particular session, the user device will submit a request to the interactive session system 140 requesting the session data 142 for that particular session. In turn, the user can experience the requested session.

A user experiences a session by use of one or more user devices 130. Other types of input and output devices may also be used, depending on the type of interactive session. For example, an augmented reality visor that provides a view of a real-world environment augmented by computer-generated graphics may be used. A tactical sensory input device and a tactical sensory output device that applies pressure to a user's body and that the user interprets as simulated motion or other type of feedback may also be used.

Some implementations of an interactive session system 140 provide interactive sessions in real time or near real time. A real time or near real time interactive session can be an interactive session that is created in response to a user request for the interactive session. For example, real-time sessions may be provided by a company for repairing a product sold by the company when the user does not find a stored interactive session that fulfills the user's informational needs. Likewise, interactive sessions may be provided as part of a consultation process. For example, an automobile mechanic may contact a user at another location, e.g., the user's home, to consult with the user regarding an automobile repair. The automobile mechanic may then explain to the user, by means of an interactive session that highlights certain parts of the automobile engine as seen from the point of view of the automobile mechanic, certain repairs that are necessary and request authorization from the user to proceed. The user can ask questions and discuss alternatives with the automobile mechanic during the interactive session to make an informed decision.

A single interactive session may include the performance of a single task or multiple different tasks. For example, an interactive session demonstrating how to make a paper airplane could be considered to include the single task of making a paper airplane. Another interactive session that demonstrates how to cook a pork shoulder may be considered to include a single task of cooking a pork shoulder, or can be considered to include multiple different tasks. For example, the task of cooking a pork shoulder may include the separate tasks of preparing the grill, preparing the meat for cooking, cooking the meat, and preparing the cooked meat for serving.

When a user is considering whether to request presentation of a session related to a particular task and/or is interested in performing the particular task, the user may be interested in knowing what tools, materials, or other items (collectively referred to as implements) the user is required to have to complete the particular task, and/or what implements are optional for completing the particular task. For example, assume that a user is interested in installing a ceiling mounted speaker and is going to learn to install the speaker using an interactive session. Prior to requesting presentation of a pre-recorded session or starting a real-time interactive session, the user may be interested in knowing that the user will need a ladder, a ceiling mount speaker, a drywall cutting tool, and speaker wire in order to perform the task. The user may also be interested in knowing that optional items that the user may want to use during the speaker installation include an adjustable speaker hole cutter (e.g., in place of or in addition to a standard drywall cutting tool) to precisely cut holes the size of the speakers, a fish tape for running the speaker wire behind the drywall, and/or conduit that can be placed behind the drywall.

By reviewing multiple different resources related to installing a ceiling mount speaker, a user may be able to identify a set of implements that are generally required/optional for installing the speaker. However, this research takes time and the user may find conflicting information about which implements are required and which are optional. Additionally, the list of implements identified through the user's research may not match the set of implements that are required/optional for installing the speaker in the manner specified in the interactive session that will guide the user through the installation process.

The interactive session system 140 is configured to identify, for a particular task, a set of implements that are required to perform the particular task and a set of implements that can optionally be used to perform the particular task. In some implementations, the interactive session system 140 identifies the set of implements based on an analysis of interactive sessions in which the particular task has been performed. For example, the interactive session system 140 (or a data processing apparatus independent of the interactive session system 140) can use object identification techniques to identify implements that were used to perform the particular task in each of multiple different available interactive sessions. Likewise, the interactive session system 140 can also use speech recognition techniques to identify keywords that describe implements. In some implementations, the interactive session system 140 can correlate in time the identification of implements using visual technique with the identification of implements using speech recognition techniques. For example, an expert may hold an implement before the camera and describe the implement. Such correlations are indicative of a very high likelihood of an accurate identification of a particular implement.

The interactive session system 140 can use information about the implements used to perform the particular task to identify those implements that are required to perform the particular task ("required implements") and those implements that can optionally be used to perform the particular task ("optional implements"). In some implementations, an implement is classified as, or otherwise considered to be, a required implement for a particular task if the implement is used in at least a threshold number, or portion, of the interactive sessions in which the particular task is performed. For example, an implement can be classified as a required implement for the particular task if the implement is identified in at least 70% (or some other portion) of the interactive sessions in which the particular task is performed. Implements that have been identified in the interactive sessions, but not classified as, or otherwise considered to be, required implements for the particular task can be classified as or considered optional implements for the particular task.

To illustrate, assume that a drywall cutting tool is identified as being used in 95% of the interactive sessions demonstrating how to install a ceiling mount speaker, while fish tape is identified in 50% of the interactive sessions. In this example, the drywall cutting tool will be classified as a required implement for installing a ceiling mount speaker, while the fish tape will be classified as an optional implement, assuming that the threshold value for classifying implements is 70% as discussed above.

In some implementations, the determination of whether a particular implement is a required implement can be based not only on the number of interactive sessions in which the particular implement was identified, but also on the number of interactive sessions in which implements in the same class of implements as the particular implement are identified. For example, an adjustable speaker hole cutter is a particular type of drywall cutting tool that can be used as part of the ceiling speaker installation process. In this example, the identification of the adjustable speaker hole cutter in an interactive session can contribute to both the total number of interactive sessions in which an adjustable speaker hole cutter was identified and the total number of interactive sessions in which a drywall cutting tool was identified. Thus, the identification of a particular implement as either a required implement or an optional implement can consider all implements that are considered to be of a same class as the particular implement, even if some of those implements may be more specifically classified.

In some implementations, the determination of whether a particular implement is a required implement can be based, in part, on sentiment detection and keyword detection using speech recognition. For example, an expert, when describing an implement, may state that the implement "is required" or "will be needed," or, alternatively, may state that the implement is "optional" or "could also be used," etc. Positive sentiments for "required" and "optional" can be aggregated and taken into account when determining whether an implement is required or optional.

The interactive session system 140 can index each implement that has been classified as either required or optional according to the particular task. For example, assume that the particular task is installing a ceiling mount speaker, and that a drywall cutting tool has been identified as a required implement, and that an adjustable speaker hole cutter has been identified as an optional implement. In this example, data identifying these required and optional implements can be stored with a reference to installing a ceiling mount speaker. The data can be stored and indexed in the session data 142 or another data store.

When a search query references a particular task that is included in the index, the set of required and/or optional implements for the particular task can be obtained from the index, and data identifying the required and optional implements can be provided to a user device that provided the search query. For example, assume that a search query referencing installation of a ceiling mount speaker is received from a user device. In this example, the interactive session system 140 can identify those required and optional implements that have been indexed as implements for installing a ceiling mount speaker. In turn, the interactive session system 140 can provide information identifying the required and/or optional implements to the user device from which the search query was submitted (e.g., through the network 102 and/or search system 110).

The information identifying required and optional implements for a particular task (referred to collectively as "implement information") can be used to inform the user of the implements that they will need to complete the task. This implement information can be provided, for example, in an informational search result (e.g., a search result that provides information obtained from multiple different resources). For example, in response to a search query referencing a particular task, a search result informing the user of the implements that are required/optional for performing the particular task can be provided in an informational search result along with navigational search results (e.g., search results that include an active link to a resource that has been identified as relevant to the search query).

Additionally, the implement information can be used to facilitate selection of advertisements that are provided based on the search query. For example, if a drywall cutting tool is identified as a required implement, an advertisement for a retailer that sells drywall cutting tools may be selected for presentation in response to the search query. As discussed in more detail below, the advertisement selection can also be based on information provided by the user, such as a set of implements that the user owns, information identifying required implements for other tasks that were performed in interactive sessions previously experienced by the user, and information related to how often a particular implement needs to be replaced or replenished.

As will be described in more detail with reference to FIG. 6, the interactive session system 140 or a data processing apparatus independent from the interactive session system 140 can determine a reliability measure for a product/part based on user requests for interactive sessions. For example, the interactive session system 140 can determine, for a particular product, a number of users that have experienced an interactive session in which the product, or a particular part of the product, was repaired. This information, alone or in combination provided by a manufacturer of the product or provided by users, can be used to determine a reliability measure for the product. The reliability measure can be, for example, a failure rate for the particular product or part, a relative reliability ranking for a set of products of a particular type, or a reliability profile for a set of parts that are included in the product.

For example, with respect to a particular product, a particular part that most often fails and a portion of all product failures that are attributed to failure of that particular part can be determined based on the portion of interactive sessions in which the particular part is repaired or replaced. In the context of a set of products of a particular type, an analysis of the interactive sessions can reveal which of the products are more prone to need repair or replacement based on a number of interactive sessions related to repair of each product relative to the total number of interactive sessions related to repairing the set of products.

Figure 2:
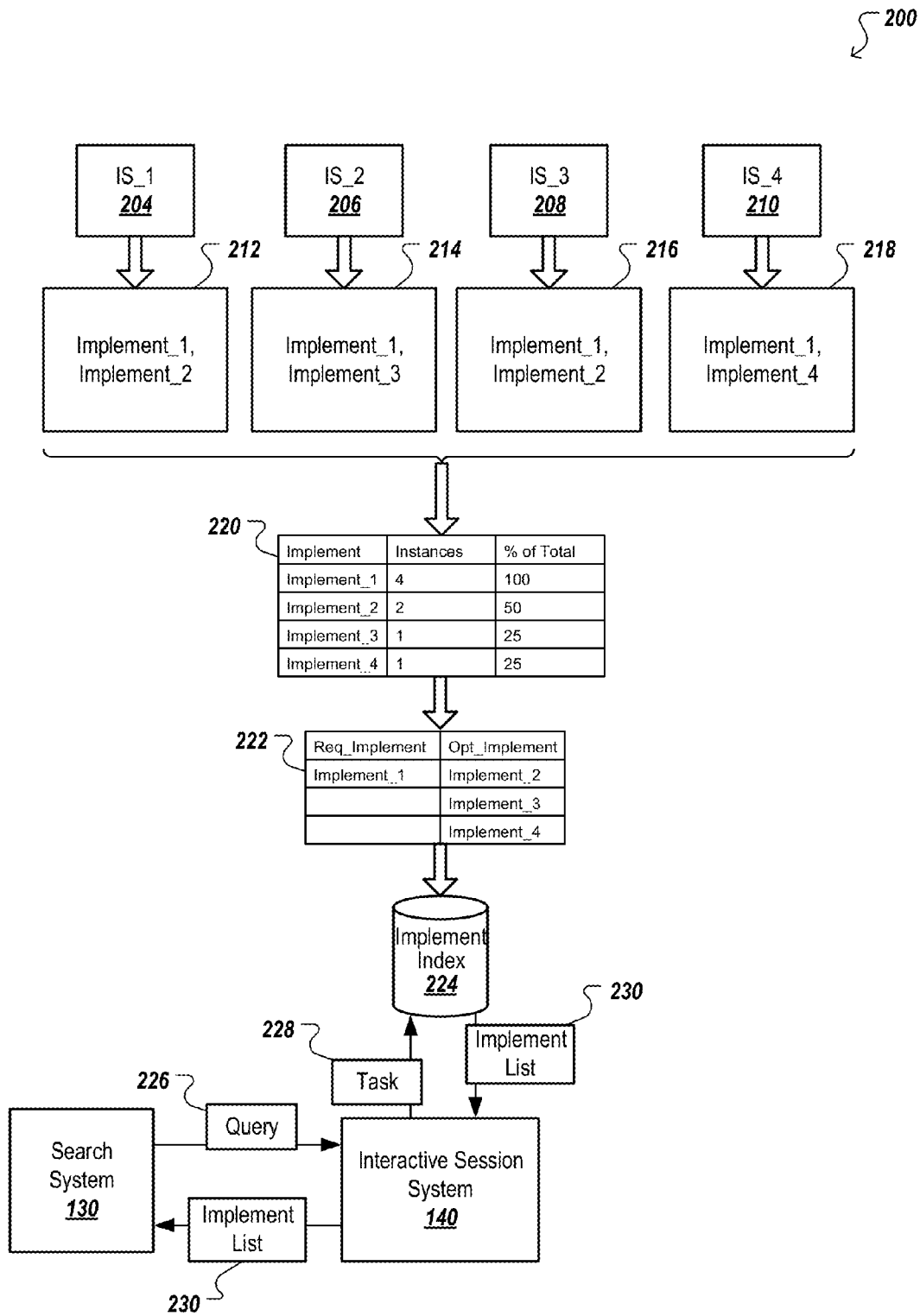
FIG. 2 is a block diagram illustrating an example implement identification technique.

FIG. 2 is a block diagram 200 illustrating an example implement identification technique. The block diagram 200 illustrates a set of operations 202 performed by the interactive session system 140 or an independent data processing apparatus to index required/optional implements for a particular task. The set of operations 202 includes identification of interactive sessions for a particular task (e.g., interactive sessions in which the particular task is performed). For example, the interactive session system 140 can identify the interactive sessions 204, 206, 208, and 210 as interactive sessions in which a particular task is performed.

In some implementations, the interactive session system 140 identifies the interactive sessions that are related to a particular task based on labels associated with the interactive sessions. As noted above, each interactive session can be associated with (e.g., indexed according to or stored with a reference to) one or more labels specifying one or more tasks that are performed during the interactive session. The interactive session system 140 can identify the interactive sessions having labels referencing the particular task as interactive sessions that will be used to identify required implements and optional implements for performing the particular task.

The interactive session system 140 processes the content of the interactive sessions 204, 206, 208, and 210 to identify sets of implements 212, 214, 216, and 218 that are used to perform the particular task in the respective interactive sessions. In some implementations, the interactive session system 140 utilizes object recognition techniques and/or audio analysis to identify the implements for each of the interactive sessions.

For example, the interactive session system 140 can use an object identifier to identify one or more implements that are presented in video or still images during the interactive session. The interactive session system 140 can also use an audio analyzer to determine whether the audio portion of the interactive session includes a reference to the implement. In this example, assume that the implement is identified by the object identifier and determined to be referenced by the audio analyzer when the implement is presented. Based on this evaluation of the interactive session, the implement can be considered to be used during the interactive session.

In some implementations, audio and visual analysis of an interactive session do not both need to be used to determine that an implement is used in a particular interactive session. For example, only visual or only audio identification of an implement can be sufficient to identify the implement as being used during the interactive session. Additionally, other techniques can be used to determine that implements are used during an interactive session. For example, a provider of the interactive session may provide a list of implements used during the interactive session and/or user feedback specifying the implements used during the interactive session can be used to identify the implements used during the interactive session.

As illustrated in FIG. 2, some of the implements may be identified in multiple different interactive sessions, while some implements may only be identified in one or fewer than all the interactive sessions. For example, implement_1 is included in each set of implements 212, 214, 216, and 218, implement_2 is only included in the sets of implements 212 and 216 for the interactive sessions 204 and 208. Additionally, implement_3 is only included in the set of implements 214 for the interactive sessions 206, and implement_4 is only included in the set of implements 216 for the interactive session 208.

In some implementations, the interactive session system 140 classifies the implements in the sets of implements 212, 214, 216, and 218 based on a portion of the interactive sessions 204, 206, 208, and 210 in which the implements were identified. The interactive session system 140 can create a table 220, or another data structure, in which each implement is associated with an inclusion value specifying a portion of the interactive sessions 204, 206, 208, and 210 in which the implement was identified. For example, as illustrated by FIG. 2, the table 220 includes a list of the implements identified in the sets of implements 212, 214, 216, and 218.

Each of the implements is associated with a number of instances of the implement that were identified. In this example, the number of instances represents the number of the interactive sessions 202, 206, 208, and 210 in which the implement was identified and/or a number of the sets of implements 212, 214, 216, and 218 in which the implement was included. For example, as indicated by the table 220, implement_1 was included in four interactive sessions, implement_2 was included in two interactive sessions, and each of implement_3 and implement_4 was included in one interactive session.

Each of the implements is also associated with an inclusion value specifying a portion of all of the analyzed interactive sessions in which the implement was identified. For example, four interactive sessions 204, 206, 208, and 210 were analyzed by the interactive session system 140. Therefore, based on the numbers of instances for each of the implements, the interactive session system 140 can determine that implement_1 was included in 100% of the interactive sessions, implement_2 was included in 50% of the interactive sessions, and that interactive session 3 and interactive session 4 were each included in 25% of the interactive sessions.

The interactive session system 140 can classify each of the implements as either a required implement or an optional implement for the particular task based on the inclusion value for the implement. The classification of an implement can be based, for example, on a comparison of the inclusion value for the implement and a threshold inclusion value. If the inclusion value for the implement meets (e.g., equals or exceeds) the threshold inclusion value, the implement is classified as a required implement. If the inclusion value for the implement does not meet the threshold inclusion value, the implement is classified as an optional implement. For example, if the threshold inclusion value is set to 70%, implement_1 will be classified as a required implement since implement_1 has an inclusion value of 100%. In this example, implement_2, implement_3, and implement_4 will each be classified as optional implements since each of these implements has an inclusion value that is below the threshold inclusion value.

In some implementations, the inclusion value for a particular implement can be based on the combined number of instances of that particular implement and the number of instances of another implement that is the same type of implement as the particular implement. For example, assume that implement_2 is a drywall cutting tool, and that implement_3 is a speaker hole cutter, which is a particular type of drywall cutting tool. In this example, the total number of instances of drywall cutting tools can be the sum of the number of instances of the drywall cutting tool and the number of instances of the speaker hole cutter. As illustrated by table 220, the number of instances of implement_2 is two, and the number of instances of implement_3 is 1. Thus, in this example the total number of instances of drywall cutting tools, which includes both implement_2 and implement_3, is three and the inclusion value for the drywall cutting tool is 75%, which meets the threshold inclusion value of 70%. Accordingly, in this example, a drywall cutting tool can be classified as a required implement.

In some implementations, a quality score of the interactive session can be used to weight the contribution of an implement from that interactive session. Quality scores may be based on, for example, user ratings, ratings of the expert that provided the session, and other appropriate factors. Implement contributions from interactive sessions with relatively low quality scores may be discounted, while implement contributions from interactive sessions with relatively high quality scores may be fully counted or even boosted.

The interactive session system 140 can create an index of required and optional implements for the particular task. For example, as illustrated by the table 222, implement_1 can be indexed as a required implement, while implement_2, implement_3, and implement_4 can be indexed as optional implements. The interactive session system 140 can store the index of required and optional implements in an implement index 224. As described in more detail below, the interactive session system 140 can identify the required and/or optional implements for a particular task by obtaining data from the implement index, and then provide information specifying the required and/or optional implements to a user device.

In some implementations, the interactive session system 140 will obtain the list of required and/or optional implements from the implement index 224 in response to receiving a search query 226 ("query"). For example, the interactive search system 140 may receive a search query 226 from the search system 130 or from a user device that submitted the search query 226.

As described in more detail below, the interactive session system 140 identifies a particular task 228 that is referenced by the search query 226, and can request, from the implement index 224, an implement list 230 for the particular task 228. The implement list 230 can specify the required implements for performing the particular task and/or the optional implements for performing the particular task.

The interactive session system 140 provides the implement list 230 to the search system 130 or a user device in response to the search query. For example, the implement list 230 can be presented at the user device with search results responsive to the search query and/or in association with one or more interactive sessions in which the particular task is performed.

In some implementations, the interactive session system identifies the particular task 228 that is referenced by the search query 226 from an index of particular tasks and corresponding search queries that have been determined to reference each particular task. In some implementations, the index of particular tasks and corresponding search queries is created and maintained by a data processing apparatus independent of the interactive session system 140, and the interactive session system 140 can interact with that independent data processing apparatus to obtain information identifying the particular task 228.

In some implementations, the interactive session system 140 can create and/or maintain the index of particular tasks and corresponding search queries. The particular task referenced by a search query can be determined based on tasks performed in interactive sessions that were requested by users through interaction with search results provided in response to the search query. For example, in the interaction logs data associated with a particular search query can include data specifying, for each interactive session referenced by search results responsive to the search query, a number of user requests for the interactive session through user interaction with the search results.

The particular task can be selected from a set of candidate tasks performed during the interactive sessions that were requested through user interaction with the search results. For example, the candidate task that is performed in a highest number or highest portion of the identified interactive sessions can be selected as the particular task that is referenced by the search query.

In some implementations, the candidate tasks performed during the interactive sessions are identified based on labels, or other data, specifying the tasks that are performed during the interactive session. The labels can be associated with the interactive session by a provider that provides the interactive session and/or users that have requested the interactive session.

The provider of the interactive session can, for example, provide labels specifying that task A and task B are both performed during the interactive session. The provider of the interactive session can also provide data specifying portions of the interactive session with which the labels are associated. For example, if task A is performed between time=0 and time=t1 of the interactive session, the provider can associate a start time of time=0 and an end time of Time=t1 with the label corresponding to task A. Similarly, the provider can associate a start time of time=t1 and an end time of time=t2 with task B if task B is performed between times t1 and t2 of the interactive session.

Users that experienced an interactive session can similarly associate labels with portions of interactive sessions. For example, while viewing an interactive session, a user can identify a start of a particular task and provide a label identifying the task being performed. When the interactive session advances to the end of the task, the user can provide feedback identifying the time at which the task ended. These user labels can be aggregated to select one or more labels that are considered to represent tasks being performed during the interactive sessions.

Based on the label data, a number or portion of the interactive sessions that includes each candidate task can be determined. For example, the labels that are associated with each portion of an interactive session can be used to identify the candidate tasks that are performed during the interactive session. For each candidate task, the number of interactive sessions that are associated with a label referencing the candidate task can be determined. In turn, one or more of the candidate tasks that are associated with a threshold number (or portion) of the identified interactive sessions can be selected as the particular task referenced by the search query. The threshold number (or portion) can be an absolute value or a relative value. For example, the particular task can be a candidate task that is associated with at least 60% of the identified interactive sessions and/or the candidate task that is associated with the highest number of interactive sessions (e.g., among the candidate tasks). The particular task that is determined to be referenced by the search query can be stored with a reference to the particular task.

Figure 3:
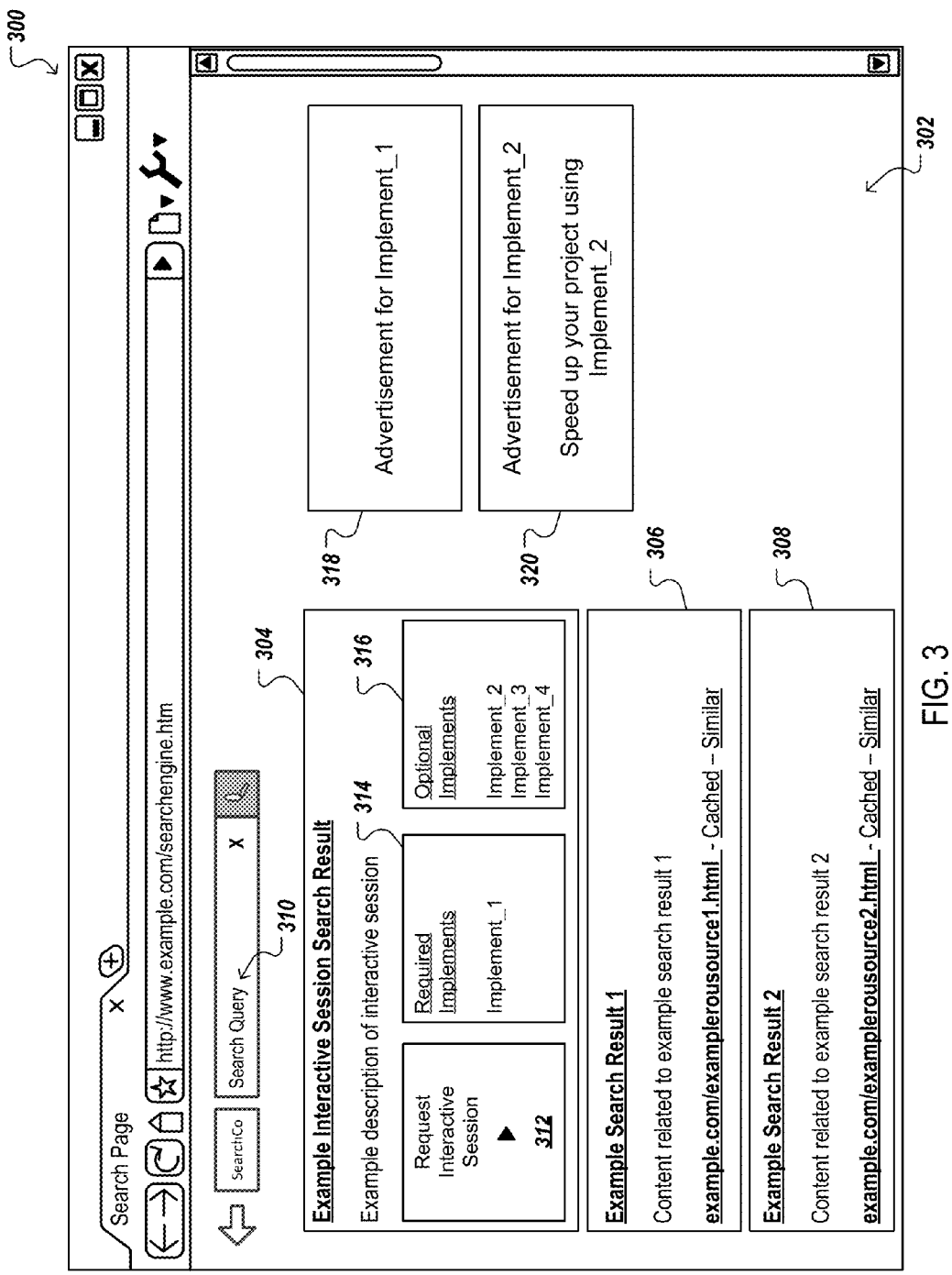
FIG. 3 is a screenshot of an example user interface in which implement information is provided to users.

FIG. 3 is a screenshot of an example user interface 300 in which implement information is provided to users. The user interface 300 is presenting an example search results page 302 in which example search results 304, 306, and 308 are displayed in response to submission of a search query 310. The example search results 306 and 308 are search results that reference web pages related to the search query, and user interaction with the search results 306 or 308 will redirect a user device to the web pages referenced by the respective search results.

The example search result 304 references an interactive session that has been identified as relevant to the search query 310. For example, the interactive session referenced by the search result 304 may include performance of the particular task that has been determined to be referenced by the search query 310, as described above. User interaction with the search result 304 can request a resource providing more information about the interactive session and/or request presentation of the interactive session.

For example, the search result 304 includes a session request element 312 that requests presentation of the interactive session in response to user interaction with (e.g., a user click of) the session request element 312. The search result 304 can also be created to include an active link that requests an interactive session scheduling page at which a user can schedule future presentation of a pre-recorded or real time interactive session. For example, user interaction with any portion of the search result 304 can initiate a request for the session scheduling page.

The search result 304 also includes implement information areas 314 and 316. The implement information areas 314 and 316 present information about the implements that are used to perform the particular task that is referenced by the search query. For example, the implement information area 314 can present information specifying required implements that are required to perform the particular task that is referenced by the search query. Similarly, the implement information area 316 can present information specifying optional implements for performing the particular task.

In some implementations, user interaction with either of the implement information areas 314 or 316 can initiate a request for more information about the required and/or optional implements. For example, user interaction with the implement information area 314 can request presentation of a resource that presents an image of the required implement(s) and/or information about how to utilize the required implement(s).

The search results page 302 also includes advertisements 318 and 320 that are presented in response to the search query 310. In some implementations, the advertisements 318 and/or 320 are selected for presentation based at least in part on one or more implements that are identified as required implements or optional implements for the particular task. For example, as illustrated by FIG. 3, the advertisement 318 is an advertisement for implement_1, which is a required implement for the particular task, and advertisement 320 is an advertisement for implement_2, which is an optional implement for the particular task.

In response to receiving the search query 310, the search system (or the interactive session system) can submit a content item request to a content item management system. The content item request can include data specifying one or more of the search query, the particular task referenced by the search query, one or more interactive sessions in which the particular task is performed, a list of required implements for the particular task, a list of optional implements for the particular task, and/or a set of implements that the user has used during previous interactive sessions or that the user has otherwise identified as implements that are possessed by the user. Using the data in the content item request, the content item management system can select one or more advertisements (or other content items) for presentation with the search results page.

Figure 4:
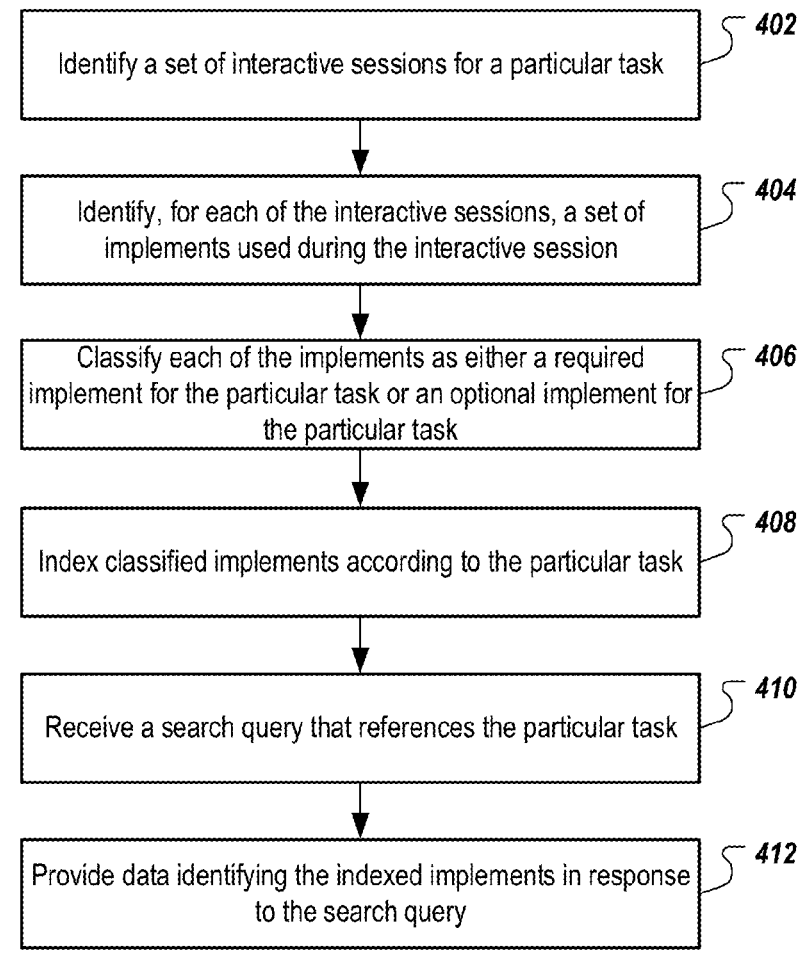
FIG. 4 is a flow chart of an example process for identifying a set of implements for a particular task.

FIG. 4 is a flow chart of an example process 400 for identifying a set of implements for a particular task. The process 400 can be performed, for example, by one or more of the interactive session system 140, the search system 110, and/or another data processing apparatus. The process 400 can also be implemented as instructions stored on computer storage medium. Execution of the instructions by a data processing apparatus can cause the data processing apparatus to perform the operations of the process 400.

A set of interactive sessions are identified for a particular task (402). In some implementations, the set of interactive sessions includes interactive sessions that were previously experienced by users. Each of the identified interactive sessions can be, for example, an interactive session in which the particular task was performed. As described above with reference to FIG. 2, the particular tasks performed during an interactive session can be identified based on labels associated with the interactive sessions.

A set of implements used during each of the interactive sessions is identified (404). The set of implements can include, for example, a set of parts that are used during the interactive session and a set of tools that are used to manipulate the parts. For example, the set of parts can include screws, nails, bolts, wire, pieces of metal or plastic, or other parts that can be used during performance of a task. Tools are those objects, such as screwdrivers, hammers, wrenches, wire cutters, or other objects with which the parts are manipulated. Each part or tool can be classified as either a required part or tool or an optional part or tool using operations described throughout this document.

In some implementations, the set of implements used during each of the interactive sessions is identified based on objects identified in a video portion of the interactive session. For example, the video portion of the interactive session can be provided to an object identification apparatus that is configured to identify objects that appear in video and/or images. The object identification apparatus can return a list of objects that were identified in the video portion of the interactive session. In some implementations, the list of objects can include, for each object, an elapsed time (e.g., measured from a beginning of the interactive session) at which the object appears in the interactive session. This list of objects can be identified as the set of implements for the interactive session, or further analysis of the interactive session can be performed as described below.

In some implementations, audio processing techniques can be used to identify the set of implements for an interactive session. For example, the audio portion of the interactive session can be provided to an audio analyzer, such as a speech recognition apparatus, that identifies audible references to objects in the interactive session. The audio analyzer can return a list of objects that were referenced in the audio portion of the interactive session. In some implementations, each object in the list can be associated with an elapsed time (e.g., measured from a beginning of the interactive session) at which the object was audibly referenced in the interactive session. This list of objects can be identified as the set of implements for the interactive session.

When lists of objects are identified using both the audio and video portions of the interactive session, the set of implements for the interactive session can be identified based on the union of the lists or the intersection of the lists. For example, assume that implement_1 was identified in the video portion of the interactive session and that both implement_1 and implement_2 were identified in the audio portion of the interactive session. In this example, the set of implements for the interactive session will include only implement_1 if only the intersection of the lists are included in the set of implements. However, if the union of the lists is used to identify the set of implements, both implement_1 and implement_2 will be included in the set of implements.

The set of implements for an interactive session can be identified, at least in part, based on user feedback related to the interactive session. In some implementations, users can provide data specifying one or more implements that were used during the interactive session, one or more implements that were not used during the interactive session, and/or data specifying the importance of one or more implements for performing the particular task.

For example, after experiencing an interactive session, a user can be provided with an interface listing a set of objects that were identified in the interactive session (e.g., using either video or audio analysis). Each of the objects can be associated with feedback elements that allow the user to specify whether they used the object and/or whether the object was required to perform the particular task. User interaction with the feedback elements can submit the user's feedback to the interactive session system, which can use the data when selecting a set of implements for the interactive session and/or for classifying a particular implement as a required implement or an optional implement.

The interface provided to the user can also enable the user to identify additional objects that may not have been identified based on the video or audio analysis. For example, if a particular tool was used by the user during an interactive session, but that tool was not identified in either the video or audio portion of the interactive session, the user can submit data specifying that the particular tool was used during the interactive session, and the particular tool can be included in the set of implements for the interactive session.

Each of the identified implements identified in the interactive sessions is classified as a required implement or an optional implement (406). In some implementations, at least one of the implement from the sets of implements is classified as a required implement. An implement can be identified as a required implement, for example, based on a portion of the interactive sessions in which the implement was identified, as discussed above with reference to FIG. 2. Implements that are not classified as required implements for the particular task can be classified as optional implements for the particular task.

In some implementations, the classification of an implement as either a required implement or an optional implement can be based, at least in part, on user feedback related to the implement. For example, as discussed above, users can provide feedback specifying whether a particular implement was used during the interactive session. This feedback can be used in addition to other data to determine whether an implement was used during the interactive session. For example, even if a particular implement was not identified as used based on video or audio analysis of the interactive session, if at least a threshold portion of users specified that the particular implement was used, the particular implement may still be classified as a required implement for the particular task.

Classified implements are indexed according to the particular task (408). In some implementations, each classified implement is stored with a reference to the particular task. For example, each of the classified implements can be stored in a data store with data specifying that the implement is either a required implement or an optional implement for the particular task.

A search query that references the particular task is received (410). In some implementations, the search query is a text query that has been determined to reference the particular task, as described above with reference to FIG. 2.

In some implementations, the search query is an image query that references the particular task. An image query that references a particular task can include, for example, an image of a partially assembled product or an image of a part. For example, assume that a user takes a picture of a partially assembled desk from a furniture retailer, and submits the image as an image search query. In this example, the search system or another data processing apparatus can identify the image search query as an image of the partially assembled desk. Once the image has been identified as the partially assembled desk, the identification of a particular task that is referenced by the search query can be performed in a manner similar to that described above.

In some implementations, an image of the partially assembled product can be identified as such based on a measure of image similarity between the image search query and images that have been labeled as images of the partially assembled product. For example, images that have been labeled as images of the partially assembled product can be provided by a manufacturer of the product or obtained from previously experienced interactive sessions in which the product was assembled. The measure of image similarity can be based on the similarity between the visual features of the image search query and visual features of the labeled images. If the measure of image similarity between the image search query and the labeled images meets a threshold similarity, the image search query can be considered to be a reference to the partially assembled product.

In some implementations, receipt of an image search query that references a partially assembled product can be considered a search query that references assembly of a particular product. Thus, the interactive sessions that are referenced by search results in response to receipt of the image search query can be interactive sessions in which the particular product is assembled.

Data identifying the indexed implements for the particular task are provided in response to the search query (412). In some implementations, the data provided cause the required implements and the optional implements to be identified as such in the search results page, as illustrated by FIG. 3. In some implementations, data identifying the indexed implements is provided in response to receiving a reservation for an interactive session in which the particular task is performed. For example, when a user requests a future presentation of the interactive session, data identifying the required implements and/or optional implements can be presented to the user, e-mailed to the user, or otherwise made available to the user prior to the beginning of the interactive session.

Figure 5:
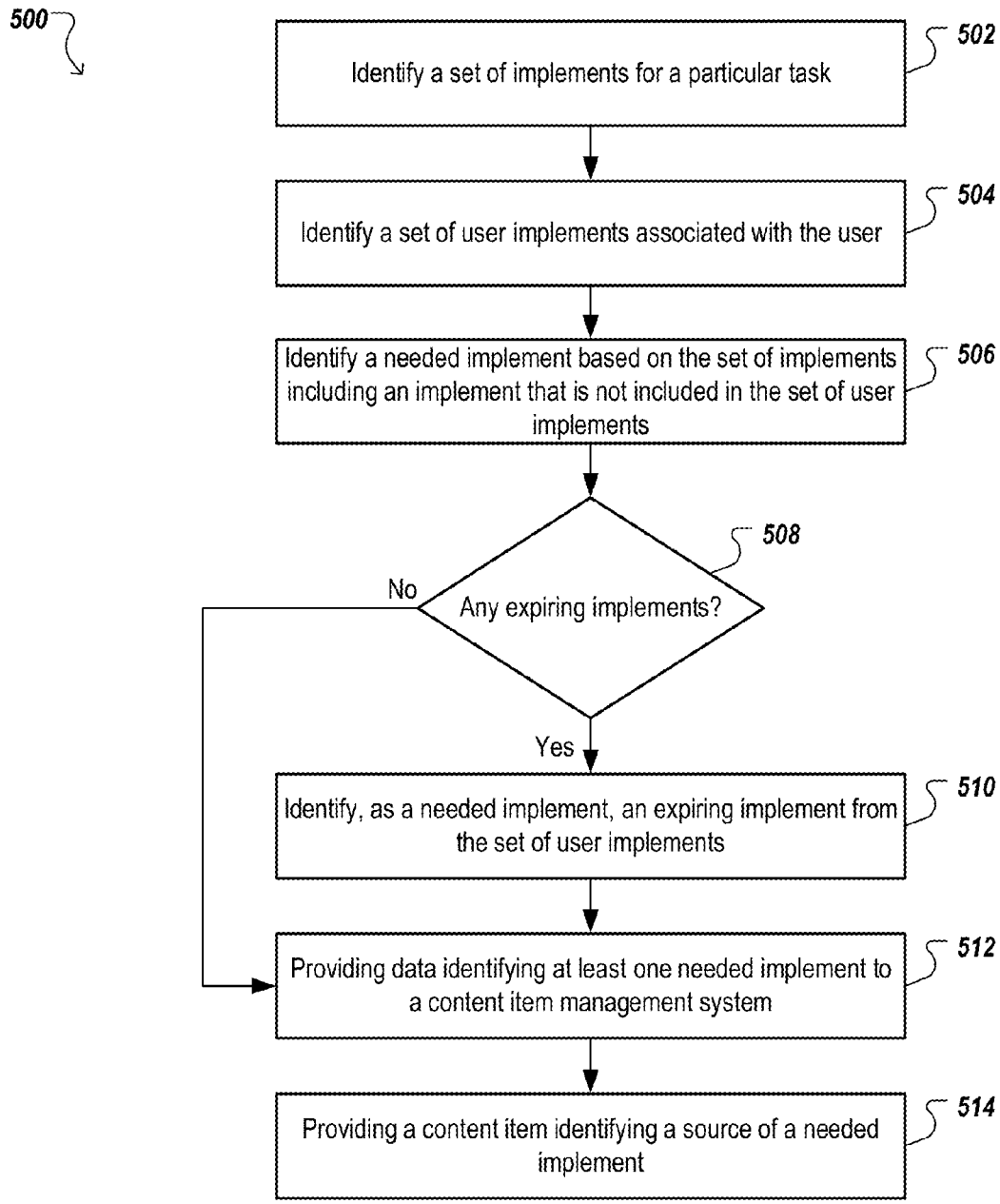
FIG. 5 is a flow chart of an example process for selecting a content item to present based on a set of implements for a particular task.

FIG. 5 is a flow chart of an example process 500 for selecting a content item to present based on a set of implements for a particular task. The process 500 can be performed, for example, by one or more of the interactive session system 140, the search system 110, and/or another data processing apparatus. The process 500 can also be implemented as instructions stored on computer storage medium. Execution of the instructions by a data processing apparatus can cause the data processing apparatus to perform the operations of the process 500.

A set of implements for a particular task are identified (502). In some implementations the set of implements can be indexed according to the particular task as described above. The set of implements can include required implements and/or optional implements for performing the particular task.

A set of user implements are identified (504). The user implements are implements that have been associated with the user. Implements can be associated with a user in a variety of ways. For example, the user can provide a list of implements that are available to the user, and this list of implements can be included in the set of user implements that are associated with the user.

The set of user implements can also include implements used during previous interactive sessions that the user has experienced, which are referred to as previously used implements. For example, assume that the user has previously requested and/or experienced an interactive session in which implement_1 was a required implement. In this example, implement_1 can be associated with the user, and therefore included in the set of user implements for the user, based on the user's previous experience of the interactive session.

The set of user implements can also include implements that have been previously purchased by the user. For example, assume that the interactive session system provides the user access to a shopping interface through which the user can purchase implements for use during interactive sessions. In this example, implements purchased by the user can be added to the set of user implements for the user.

The set of user implements can also include implements identified using object recognition techniques. For example, a user can place a set of implements within the view of a camera, and the interactive session system can use object identification techniques to identify the implements that the user has placed within the view of the camera. These identified implements can be added to the set of user implements for the user.

A needed implement is identified based on the set of implements for the particular task including an implement that is not included in the set of user implements (506). In some implementations, any implement from the set of implements is eligible to be identified as a needed implement. In some implementations, only required implements are eligible to be identified as a needed implement.

A determination is made whether the set of user implements includes an expiring implement (508). An expiring implement is an implement that has reached, or within a threshold period will reach, an estimated useful period. In some implementations, only implements that are included in the identified set of implements for the particular task and/or are included in the set of user implements are eligible for classification as an expiring implement. For example, identification of a particular implement as an expiring implement can require that an implement in the set of user implements (e.g., an implement previously used by the user) match a required implement for the particular task. In some implementations, any implement that has reached the end of the estimated useful period can be identified as an expiring implement.

The useful period for an implement will vary on a per-implement basis based on characteristics of the implement. For example, four ounces of glue may only have a useful period of a one hour interactive session in which four ounces of glue are used, a can of paint may have a useful period of several years, while a wrench may have a useful period of many years. When an implement reaches, or nears, the end of its useful period replacement, or replenishment, of the implement can be recommended.

The useful period of a particular implement can be obtained, for example, from a data base of useful periods for various implements. The data base can be created and/or maintained, for example, based on information provided by interactive session providers, users that have previously experienced interactive sessions, and/or product reliability data for the particular implement, which is discussed in more detail with reference to FIG. 6.

In some implementations, an implement can be identified as an expiring implement based on the useful period of the implement being estimated to end within a threshold period. For example, if the useful period of the implement is estimated to end before the end of an interactive session in which the implement is used, the implement can be identified as an expiring implement.

In some implementations, the end of the useful period for an implement can be based, for example, on information about the set of user implements and previous interactive sessions that have been experienced by the user. For example, assume that four ounces of glue are required to perform a first task (e.g., make a particular craft) in a first interactive session. Further assume that the user has previously experienced the first interactive session, and that data associated with, or provided by, the user indicates that the user purchased a six ounce bottle of glue for use during the first interactive session. In this example, if the identified set of implements for the particular task includes four ounces of glue, the remaining two ounces of glue, from the six ounces of glue purchased by the user, will not be enough to complete the particular task, such that the useful period for the six ounces of glue that were in the set of user implements will end before the end of the particular task. Therefore, in this example, glue can be identified as an expiring implement in the set of user implements.

If one or more expiring implements are identified, the one or more expiring implements are identified as needed implements (510). In some implementations, the one or more expiring implements are added to a set of needed implements. If no expiring implements are identified, the operation (510) can be bypassed.

Data identifying at least one needed implement is provided to a content item management system (512). In some implementations, the data specifies, for each of the needed implements, whether the needed implement is a required implement or an optional implement for the particular task.

In some implementations, the content item management system can use the data identifying the at least one needed implement to select an advertisement to be provided. For example, if glue is identified as a needed implement for the particular task, the content item management system can select an advertisement for glue to be provided to the user device. The selection of an advertisement can consider, for example, whether the implement is a required implement or an optional implement. For example, advertisements for required implements may be selected for more prominent presentation than advertisements for optional implements.

A content item is provided to identify a source of a needed implement (514). In some implementations, the content item is an advertisement identifying an entity that sells or otherwise provides the needed implement. The content item can be presented with additional data related to the needed implement. For example, data provided with the content item can include data specifying whether the needed implement is a required implement or an optional implement for the particular task. Additionally, if the needed implement will reach the end of its useful period before completing the particular task, data can be provided informing the user that the implement will reach the end of its useful period prior to completion of the particular task. In some implementations, the content item can be provided with data specifying a reliability measure for the needed implement. For example, data specifying a useful period for the implement can be provided with the content item.

In some implementations, the content item provided can be selected, based at least in part, on previous interactive sessions that have been experienced by the user. For example, if a user has experienced an interactive session titled "an introduction to making paper airplanes," a content item advertising an interactive session titled "advanced paper making techniques" may be selected for presentation to the user. Similarly, if a series of interactive sessions are made available by a same provider and/or related to a same topic, content items related to the next interactive session in the series can be provided following the user's experiencing one of the interactive sessions in the series.

Figure 6:
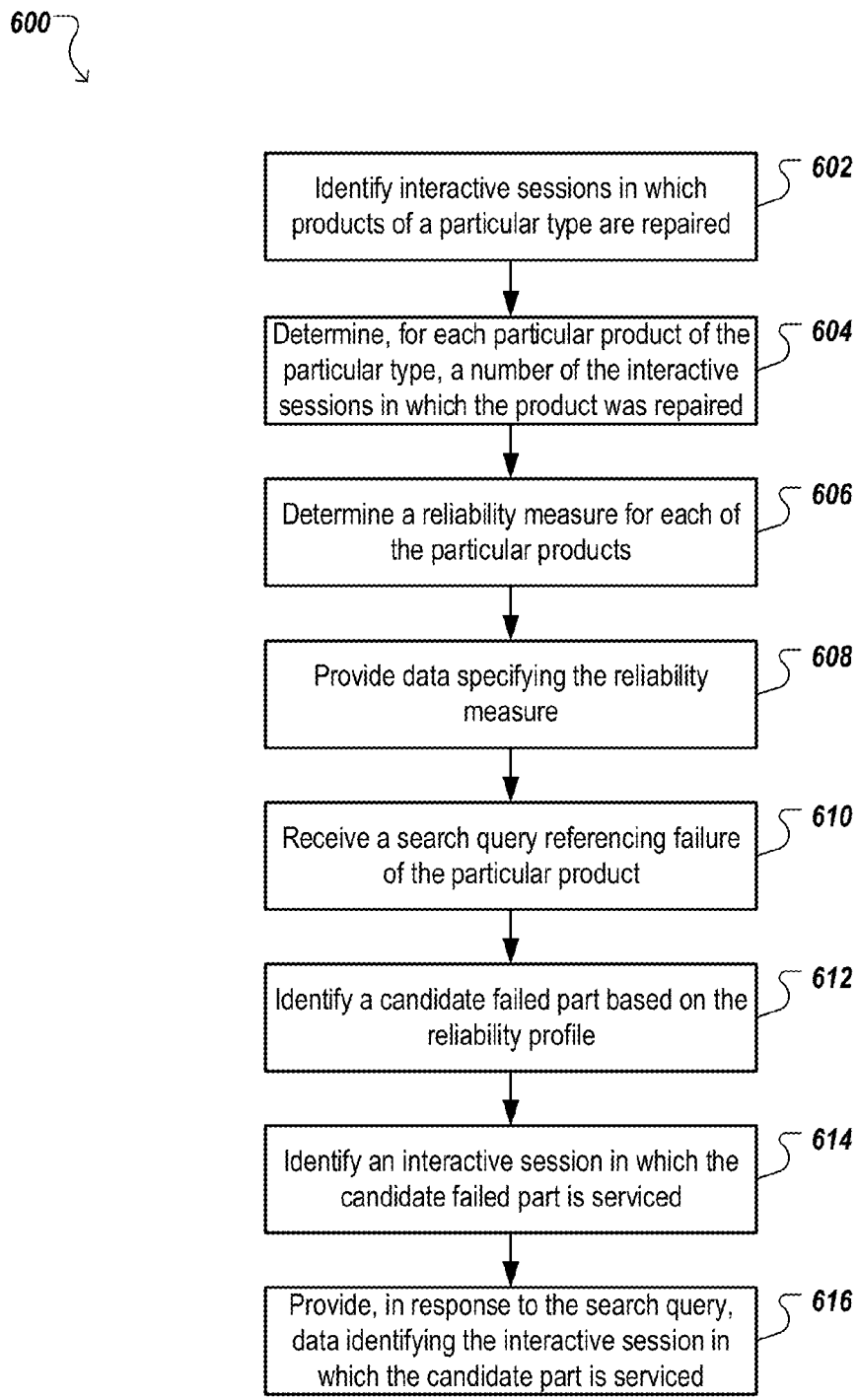
FIG. 6 is a flow chart of an example process for determining a reliability measure for a product.

FIG. 6 is a flow chart of an example process 600 for determining a reliability measure for a product. The process 600 can be performed, for example, by one or more of the interactive session system 140, the search system 110, and/or another data processing apparatus. The process 600 can also be implemented as instructions stored on computer storage medium. Execution of the instructions by a data processing apparatus can cause the data processing apparatus to perform the operations of the process 600.

Interactive sessions in which products of a particular type are repaired (602). The interactive sessions can be identified, for example, based on user interactions with search results provided in response to a search query referencing failure of the particular type of product. For example, the interactive sessions requested through user interactions with search results provided in response to search queries referencing failure of the particular type of product can be considered interactive sessions in which products of the particular type are repaired. The interactive sessions can also include interactive sessions that are identified, for example, by a manufacturer of the product or users, as interactive sessions in which the particular type of product is repaired. The interactive sessions can also include interactive sessions that are associated with labels referencing failure or repair of a product of the particular type.

For each particular product of the particular type, a number of the interactive sessions in which the product was repaired is determined (604). In some implementations, the number of interactive sessions is based on the number of user experiences of the interactive sessions. For example, a single pre-recorded interactive session can be experienced by multiple different users, and each of those experiences can be considered an instance of the interactive session that contributes to the number of interactive sessions in which the product was repaired.

A reliability measure is determined for each of the particular products (606). In some implementations, the reliability measure for each particular product can be expressed as a failure rate for the particular product. The failure rate for each product can be determined, based at least in part, on a portion of the identified interactive sessions in which the particular product is repaired. For example, assume that product X is repaired in 50% of the identified interactive sessions, product Y is repaired in 40% of the identified interactive sessions, and product Z is repaired in 20% of the identified interactive sessions. In this example, the portion of interactive sessions in which the particular product is repaired can be considered a relative measure of reliability for each of the respective products (e.g., relative to the reliability of the other products).

In some implementations, the reliability measure can be determined on a per-part basis. For example, using data associated with the interactive sessions, a determination can be made as to the part or parts of the product that were repaired. The information can be aggregated for all of the interactive sessions and the failure rate for each part of the product can be determined. For example, the information associate with the interactive sessions may indicate that part A is repaired in 70% of the identified interactive sessions, part B is repaired in 20% of the identified interactive sessions, and part C is repaired in 10% of the identified interactive sessions.

A reliability profile can be created for the parts based on the reliability measures for the parts. The reliability profile can specify, for a particular type of product, a failure rate or a likelihood that failure of the product will be caused by failure of one or more parts of the product. The reliability profile can be based, at least in part, on a number, or portions, of the identified interactive sessions in which the parts are repaired. Continuing with the example above, the repair profile can specify that there is a 70% likelihood that failure of the product will be caused by failure of part A, a 20% likelihood that failure of the product will be caused by failure of part B, and a 10% likelihood that failure of the product will be caused by failure of part C.

Data specifying the reliability measure is provided (608). The data can be provided, for example, to manufacturers of the product to facilitate improved manufacturing techniques or identify new suppliers for particular parts of the product. The data can also be provided to users that are searching for information related to failure of the particular product to facilitate identification of the cause of the failure.

A search query referencing failure of a particular product is received (610). The search query can be received, for example, from a user device. The search query can be considered to reference failure of the particular product, for example, by including a reference to the particular product and a term indicative of failure of the product. For example, if the search query includes the terms "broken," "failed," "repair," "fix," or another term indicative of product failure along with a reference to the particular product, the search query can be considered to reference failure of the particular product.

A candidate failed part is identified based on the reliability profile (612). In some implementations, the candidate failed part can be one or more of the parts having a non-zero failure rate. In the example above, part A, part B, and part C each have non-zero failure rates, and therefore are each eligible to be identified as a candidate failed part.

In some implementations, only a proper subset of the parts having non-zero failure rates are identified as candidate failed parts. For example, parts having a failure rate that does not meet a threshold failure rate may not be identified as candidate failed parts. Rather, in these implementations, those parts having failure rates that meet the threshold failure rate will be identified as candidate failed parts.

An interactive session in which the candidate failed part is serviced is identified (614). The identified interactive session can be an interactive session that is associated with data identifying the interactive session as a session in which the candidate failed part is serviced (e.g., repaired or replaced). For example, labels associated with the interactive session may reference repair or replacement of the candidate failed part. Similarly, the manufacturer of the product may provide an interactive session that demonstrates how to repair or replace the candidate failed part, and data presented with a reference to the interactive session may specify that the interactive session demonstrates the repair or replacement.

Data identifying the interactive session and required implements for servicing the candidate failed part are provided in response to the search query (616). As discussed above, the data can be provided to a user device, for example, with search results responsive to the search query.

Figure 7:
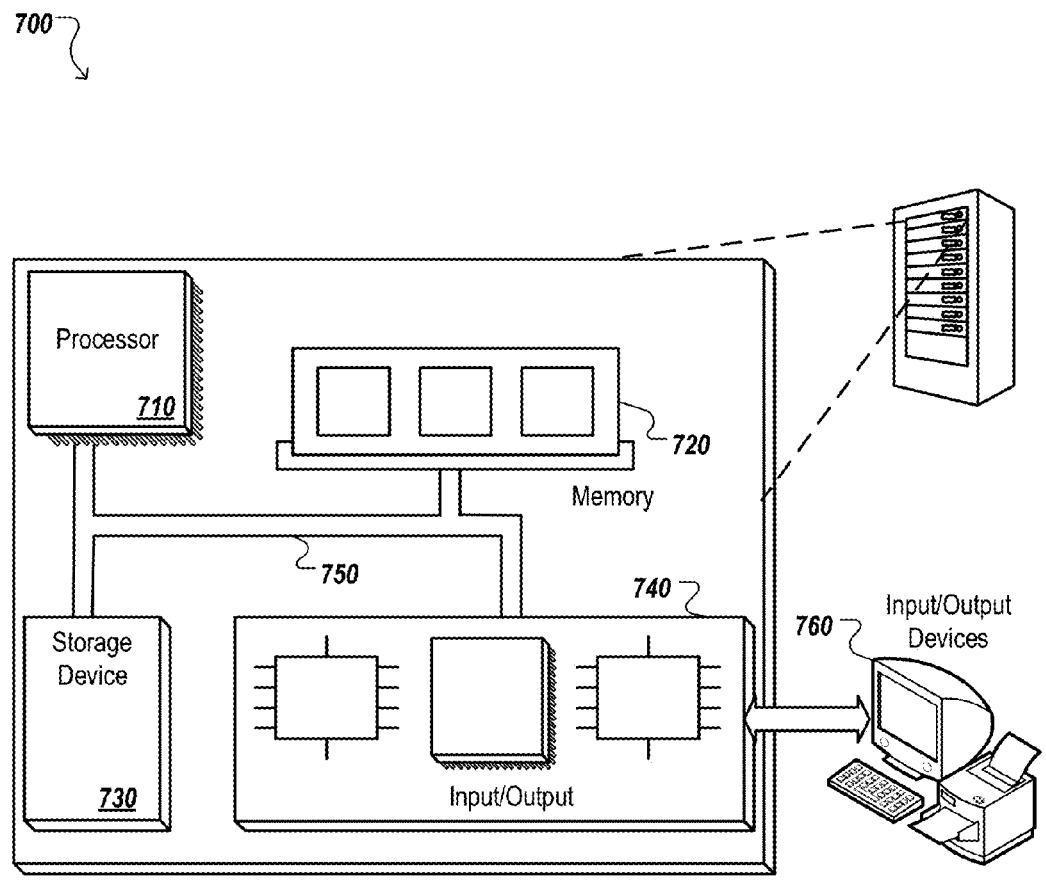
FIG. 7 is a block diagram of an example data processing apparatus.

FIG. 7 is a block diagram of an example data processing apparatus 700 that can be used to perform operations described above. The system 700 includes a processor 710, a memory 720, a storage device 730, and an input/output device 740. Each of the components 710, 720, 730, and 740 can be interconnected, for example, using a system bus 750. The processor 710 is capable of processing instructions for execution within the system 700. In one implementation, the processor 710 is a single-threaded processor. In another implementation, the processor 710 is a multi-threaded processor. The processor 710 is capable of processing instructions stored in the memory 720 or on the storage device 730.

The memory 720 stores information within the system 700. In one implementation, the memory 720 is a computer-readable medium. In one implementation, the memory 720 is a volatile memory unit. In another implementation, the memory 720 is a non-volatile memory unit.

The storage device 730 is capable of providing mass storage for the system 700. In one implementation, the storage device 730 is a computer-readable medium. In various different implementations, the storage device 730 can include, for example, a hard disk device, an optical disk device, a storage device that is shared over a network by multiple computing devices (e.g., a cloud storage device), or some other large capacity storage device.

The input/output device 740 provides input/output operations for the system 700. In one implementation, the input/output device 740 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 760. Other implementations, however, can also be used, such as mobile computing devices, mobile communication devices, set-top box television client devices, etc.

Although an example processing system has been described in FIG. 7, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML, page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
    receiving, from a client device, a search query that references failure of a particular product;
    accessing a reliability profile for the particular product that specifies a failure rate of one or more parts of the particular product;
    identifying, based on the reliability profile, a given part of the particular product that has a non-zero failure rate; and
    identifying an interactive online session that demonstrates servicing of the given part; and
    responding to the search query, including transmitting, to the client device, data identifying the interactive session that demonstrates servicing of the given part.

2. The method of claim 1, wherein receiving a search query that references failure of a particular item comprises:
    identifying, within the search query, a reference to the particular product and one or more terms indicative of failure of the particular product.

3. The method of claim 1, further comprising:
    determining failure rates of various parts of the particular product based on an analysis of one or more tasks performed during various online sessions, wherein determining the failure rate includes determining portions of the various online sessions during which the each of the various parts were serviced; and
    generating the reliability profile for the various parts based, at least in part, on the determined failure rates.

4. The method of claim 1, further comprising determining a failure rate of the given part based on an analysis of one or more tasks performed during various online sessions wherein determining the failure rate of the given part comprises determining a portion of the online sessions during which the given part was serviced relative to a total number of online sessions during which any part of the particular product was serviced.

5. The method of claim 1, wherein responding to the search query comprises including data specifying one or more implements that are required to service the given part in a search results page that is presented at the client device in response to receipt of the search query.

6. The method of claim 5, wherein including data specifying one or more implements that are required to service the given part in a search results page that is presented at the client device in response to receipt of the search query comprises including, in the search results page, a list of tools required to service the given part.

7. The method of claim 1, further comprising providing the reliability profile to a supplier of the particular product or a manufacturer of the given part.

8. A system, comprising:
    a data store storing information related to online sessions during which one or more tasks were performed; and
    one or more data processing apparatus that interact with the data store and execute instructions that cause the one or more data processing apparatus to perform operations comprising:
        receiving, from a client device, a search query that references failure of a particular product;
        accessing a reliability profile for the particular product that specifies a failure rate of one or more parts of the particular product;
        identifying, based on the reliability profile, a given part of the particular product that has a non-zero failure rate; and
        identifying an interactive online session that demonstrates servicing of the given part; and
        responding to the search query, including transmitting, to the client device, data identifying the interactive session that demonstrates servicing of the given part.

9. The system of claim 8, wherein receiving a search query that references failure of a particular item comprises:
    identifying, within the search query, a reference to the particular product and one or more terms indicative of failure of the particular product.

10. The system of claim 8, wherein the instructions cause the one or more data processing apparatus to perform operations comprising:
    determining failure rates of various parts of the particular product based on an analysis of one or more tasks performed during various online sessions, wherein determining the failure rate includes determining portions of the various online sessions during which the each of the various parts were serviced; and
    generating the reliability profile for the various parts based, at least in part, on the determined failure rates.

11. The system of claim 8, wherein the instructions cause the one or more data processing apparatus to perform operations comprising determining a failure rate of the given part based on an analysis of one or more tasks performed during various online sessions wherein determining the failure rate of the given part comprises determining a portion of the online sessions during which the given part was serviced relative to a total number of online sessions during which any part of the particular product was serviced.

12. The system of claim 8, wherein responding to the search query comprises including data specifying one or more implements that are required to service the given part in a search results page that is presented at the client device in response to receipt of the search query.

13. The system of claim 12, wherein including data specifying one or more implements that are required to service the given part in a search results page that is presented at the client device in response to receipt of the search query comprises including, in the search results page, a list of tools required to service the given part.

14. The system of claim 8, wherein the instructions cause the one or more data processing apparatus to perform operations comprising providing the reliability profile to a supplier of the particular product or a manufacturer of the given part.

15. A non-transitory computer storage medium encoded with a computer program, the program comprising instructions that when executed by data processing apparatus cause the data processing apparatus to perform operations comprising:

receiving, from a client device, a search query that references failure of a particular product;

accessing a reliability profile for the particular product that specifies a failure rate of one or more parts of the particular product;

identifying, based on the reliability profile, a given part of the particular product that has a non-zero failure rate; and identifying an interactive online session that demonstrates servicing of the given part; and responding to the search query, including transmitting, to the client device, data identifying the interactive session that demonstrates servicing of the given part.

16. The computer storage medium of claim 15, wherein receiving a search query that references failure of a particular item comprises:

identifying, within the search query, a reference to the particular product and one or more terms indicative of failure of the particular product.

17. The computer storage medium of claim 15, wherein the instructions cause the one or more data processing apparatus to perform operations comprising:

determining failure rates of various parts of the particular product based on an analysis of one or more tasks performed during various online sessions, wherein determining the failure rate includes determining portions of the various online sessions during which the each of the various parts were serviced; and generating the reliability profile for the various parts based, at least in part, on the determined failure rates.

18. The computer storage medium of claim 15, wherein the instructions cause the one or more data processing apparatus to perform operations comprising determining a failure rate of the given part based on an analysis of one or more tasks performed during various online sessions wherein determining the failure rate of the given part comprises determining a portion of the online sessions during which the given part was serviced relative to a total number of online sessions during which any part of the particular product was serviced.

19. The computer storage medium of claim 15, wherein responding to the search query includes including data specifying one or more implements that are required to service the given part in a search results page that is presented at the client device in response to receipt of the search query.

20. The computer storage medium of claim 19, wherein including data specifying one or more implements that are required to service the given part in a search results page that is presented at the client device in response to receipt of the search query comprises including, in the search results page, a list of tools required to service the given part.

* * * * *